(12) United States Patent
Gieser et al.

(10) Patent No.: US 9,315,331 B2
(45) Date of Patent: Apr. 19, 2016

(54) MACHINE HAVING A PNEUMATIC DRUM FOR PROCESSING SHEETS OF DIFFERENT FORMATS

(71) Applicant: HEIDELBERGER DRUCKMASCHINEN AG, Heidelberg (DE)

(72) Inventors: Michael Gieser, Oftersheim (DE); Michael Krueger, Edingen-Neckarhausen (DE); Helmut Meyer, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/204,368

(22) Filed: Mar. 11, 2014

(65) Prior Publication Data

US 2014/0251764 A1    Sep. 11, 2014

(30) Foreign Application Priority Data

Mar. 11, 2013    (DE) .................. 10 2013 004 224

(51) Int. Cl.
| | |
|---|---|
| *B41F 21/08* | (2006.01) |
| *B65G 29/00* | (2006.01) |
| *B65H 29/24* | (2006.01) |
| *B41F 21/10* | (2006.01) |
| *B65H 5/22* | (2006.01) |

(52) U.S. Cl.
CPC .............. *B65G 29/00* (2013.01); *B41F 21/102* (2013.01); *B65H 5/226* (2013.01); *B65H 29/243* (2013.01); *B65H 2406/362* (2013.01)

(58) Field of Classification Search
CPC ............................ B41F 21/102; B65H 29/243
See application file for complete search history.

(56) References Cited

U.S. PATENT DOCUMENTS

| 4,121,819 | A | | 10/1978 | DiFrancesco et al. | |
|---|---|---|---|---|---|
| 4,145,040 | A | * | 3/1979 | Huber ................... | B65H 5/226 271/195 |
| 4,202,542 | A | * | 5/1980 | Lammers .............. | B65H 29/243 271/195 |
| 4,437,659 | A | * | 3/1984 | Caron .................... | B65H 5/226 271/196 |
| 5,183,252 | A | * | 2/1993 | Wolber .................. | B65H 5/226 271/196 |
| 5,228,391 | A | * | 7/1993 | DeMoore ................ | B41F 21/08 101/183 |
| 6,038,976 | A | * | 3/2000 | Helmstadter ......... | B41F 21/102 101/174 |
| 6,676,787 | B2 | * | 1/2004 | Cavalotti ............ | B29D 30/0606 156/110.1 |
| 6,722,652 | B2 | * | 4/2004 | Kobayashi ............. | B41F 21/10 271/194 |
| 8,177,231 | B2 | * | 5/2012 | Fukui ..................... | B65H 27/00 271/194 |

FOREIGN PATENT DOCUMENTS

| DE | 2644232 A1 | 4/1977 | | |
|---|---|---|---|---|
| DE | 19954390 C1 | 10/2000 | | |
| DE | EP 1099552 | * 11/2000 | ........... | B41F 21/102 |

* cited by examiner

*Primary Examiner* — Gene Crawford
*Assistant Examiner* — Thomas Randazzo
(74) *Attorney, Agent, or Firm* — Laurence A. Greenberg; Werner H. Stemer; Ralph E. Locher

(57) ABSTRACT

A machine for processing sheets of different formats includes a pneumatic drum having an outer sleeve with pneumatic nozzle channels and an inner sleeve with a covering segment for covering the nozzle channels in a format-dependent way. A motor is provided to rotate the inner sleeve relative to the outer sleeve while the machine is running to carry out a flying format change of the pneumatic drum.

11 Claims, 3 Drawing Sheets

MACHINE HAVING A PNEUMATIC DRUM FOR PROCESSING SHEETS OF DIFFERENT FORMATS

CROSS-REFERENCE TO RELATED APPLICATION

This application claims the priority, under 35 U.S.C. §119, of German Patent Application DE 10 2013 004 224.0, filed Mar. 11, 2013; the prior application is herewith incorporated by reference in its entirety.

BACKGROUND OF THE INVENTION

Field of the Invention

The present invention relates to a machine having a pneumatic drum for processing sheets of different formats.

The machines include machines for printing on sheets and machines for the further processing of printed sheets. Examples are printers, printing presses and die cutting machines.

The aforementioned pneumatic drums include blower drums, suction drums, and combined blower and suction drums. Such drums are used to convey the sheets and are equipped with blown-air or suction air nozzles.

Since the sheets have different formats, the nozzles that are not covered by the conveyed sheet need to be deactivated to avoid wasting compressed air or air infiltration.

German Patent Application DE 26 44 232 A1, corresponding to U.S. Pat. No. 4,145,040, describes a suction drum wherein the number of suction slots that are successively connectible to a suction line during a revolution of an outer sleeve of the drum may be varied by the insertion of pistons into channels to varying depths. The suction drum may be adapted to different formats of the sheets to be conveyed by adjusting a piston plate. The suction drum may continuously be connected to a vacuum source and may move continuously. The activation and deactivation of the suction slots occurs automatically as a result of the rotary movement of the outer sleeve.

SUMMARY OF THE INVENTION

It is accordingly an object of the invention to provide a machine having a pneumatic drum for processing sheets of different formats, which overcomes the hereinafore-mentioned disadvantages of the heretofore-known machines of this general type.

With the foregoing and other objects in view there is provided, in accordance with the invention, a machine for processing sheets of different formats, which comprises a pneumatic drum having an outer sleeve with pneumatic nozzle channels and an inner sleeve with a covering segment for covering the nozzle channels in a format-dependent way, and at least one first motor for rotating the inner sleeve relative to the outer sleeve while the machine is running in order to carry out a flying format change of the pneumatic drum.

An advantage of the machine of the invention is that the format change is done while the machine is in operation and without stopping the drum. This saves changeover time.

In accordance with another feature of the invention, the first motor is controlled by a control unit in such a way that once the format has been set, the angular position of the inner sleeve relative to the outer sleeve remains unchanged.

In accordance with a further feature of the invention, the first motor is controlled by the control unit in such a way that the first motor is at a rotary standstill once the format has been set.

In accordance with an added feature of the invention, the first motor is disposed internal to the pneumatic drum.

In accordance with an additional feature of the invention, the first motor is controlled by a control unit in such a way that once the format has been set, the first motor drives the inner sleeve in synchronism with the outer sleeve, which is driven by a second motor in the process.

In accordance with yet another feature of the invention, the first motor and the second motor are disposed external to the pneumatic drum.

In accordance with yet a further feature of the invention, the inner sleeve is supported for rotation on a shaft that is connected to the outer sleeve in such a way as to co-rotate with the latter.

In accordance with yet an added feature of the invention, a rotary joint is disposed on the shaft.

In accordance with yet an additional feature of the invention, the rotary joint is a pneumatic and electrical rotary joint.

In accordance with again another feature of the invention, the machine is a printing press, a digital printer, or a die-cutting machine.

With the objects of the invention in view, there is concomitantly provided a method for changing the format of a pneumatic drum in a machine for processing sheets of different formats. The method comprises using the machine of the invention to carry out a flying format change on the pneumatic drum while the machine continues to run.

Other features which are considered as characteristic for the invention are set forth in the appended claims.

Although the invention is illustrated and described herein as embodied in a machine having a pneumatic drum for processing sheets of different formats, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
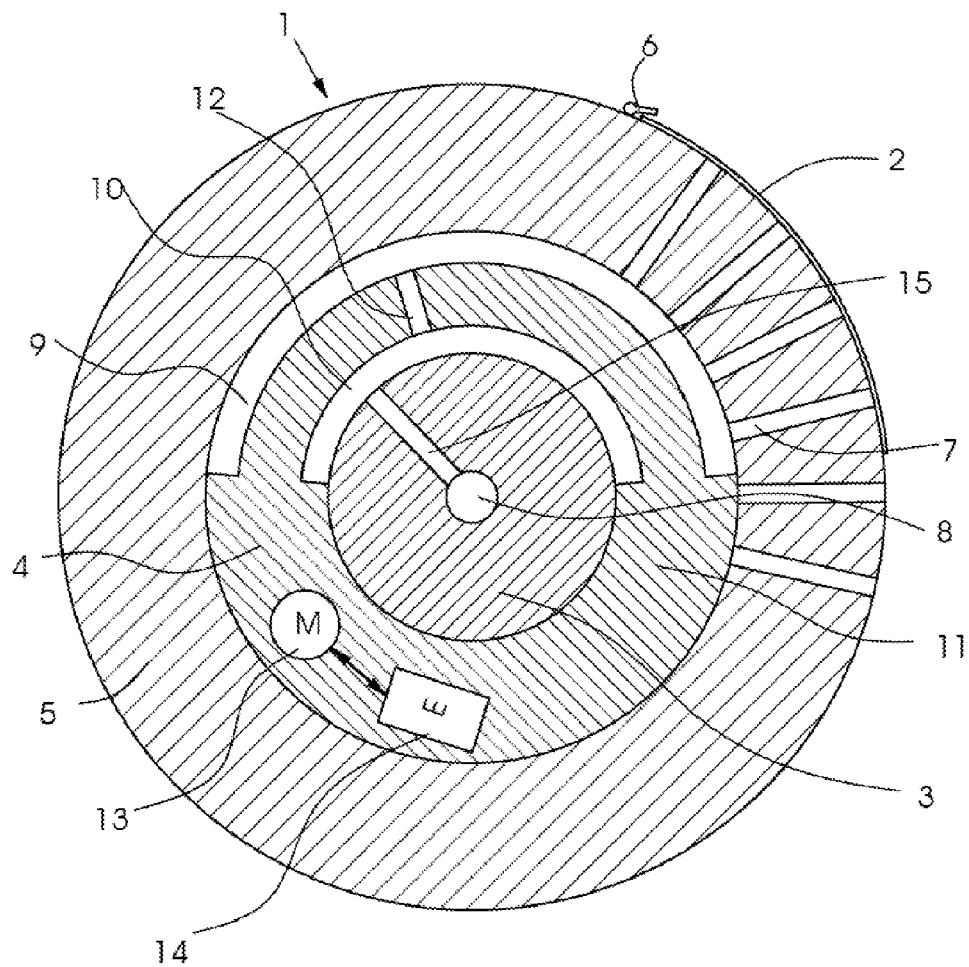
FIG. 1 is a diagrammatic, cross-sectional view of a pneumatic drum with an actuating drive for format changes disposed internal to the drum.

Referring now to the figures of the drawings in detail and first, particularly, to FIG. 1 thereof, there is seen a pneumatic drum 1 in a machine for processing sheets 2. The machine is a printing press. The pneumatic drum 1 is a vacuum drum that is used for conveying the sheets 2 and may thus be referred to as a sheet-conveying drum.

The pneumatic drum 1 includes a shaft 3, an inner ring or inner sleeve 4, and an outer ring or outer sleeve 5. The pneumatic drum 1 has a gripper system 6 for clamping the leading edges of the sheets 2.

The outer sleeve 5 has nozzle channels 7 for attracting the sheet 2 by suction. The nozzle channels 7 form rows along the circumference of the drum. The shaft 3 has a rotary joint 8 for suction air, electrical energy and control signals (data).

The inner sleeve 4 has an outer circumferential groove 9, an inner circumferential groove 10, and a covering segment 11 for closing inactive nozzle channels 7. The outer circumferential groove 9 may be a common circumferential groove of the nozzle channel rows, or a separate outer circumferential groove 9 may be provided for each nozzle channel row. The circumferential grooves 9, 10, which may also be referred to as pneumatic grooves, are shaped like an arc or a circle and are interconnected by one or more communication openings 12. The inner sleeve 4 forms a valve ring for activating the nozzle channels 7 that are covered by conveyed sheets 2 and for deactivating the nozzle channels 7 that are not covered by conveyed sheets 2 in order to prevent the non-covered nozzle channels 7 from infiltrating air.

The number of nozzle channels 7 to be deactivated by an adjustment of the inner sleeve 4 is dependent on the format of the sheets 2, which may change from job to job. The smaller the sheet format or sheet length, the more nozzle channels 7 of the respective nozzle row need to be covered.

An electrical actuating motor 13 (first motor) and an electronic control unit 14 for controlling the actuating motor 13 are disposed on the pneumatic drum 1. When the machine is running, the actuating motor 13 and the control unit 14 co-rotate with the pneumatic drum 1. The actuating motor 13 is used to rotate the inner sleeve 4 relative to the outer sleeve 5, which is disposed to co-rotate with the shaft 3.

The relative rotation may occur without stopping the drum while the machine is running to carry out a flying format change. Despite the relative rotation, in every possible setting of the inner sleeve 4, the inner circumferential groove 10 remains in air-conducting connection with a connecting channel 15 that is formed in the shaft 3 and pneumatically connects the rotary joint 8 with the outer sleeve 5. When the format is changed from a longer format to a shorter format, the inner sleeve 4 is rotated in a counter-clockwise direction in FIG. 1; when the format is changed from a shorter format to a longer format, the inner sleeve 4 is rotated in a clockwise direction.

The suction air flows from the nozzles 7, which overlap with the outer circumferential groove 10 and are covered by the sheet 2 and hold the sheet 2 by suction, into the inner sleeve 4. Inside the inner sleeve 4, the suction air flows from the outer circumferential groove 9 through the one or more communication openings 12 into the inner circumferential groove 10, which overlaps with the connecting channel 15. The suction air then continues to flow from the inner sleeve 4 into the connecting channel 15, into the rotary joint 8, and into a (non-illustrated) vacuum source (suction air source) connected thereto.

The nozzle channels 7 that are located behind the trailing edge of the respective sheet format and are not covered by the sheet 2 on the outer side of the outer sleeve 5, are covered by the covering segment 11. The covering segment 11 is tightly fitted against the inner side of the outer sleeve 5 and closes the inner-side openings of the nozzles channels 7 that are not covered by the sheet 2.

When the format has been set, the actuating motor 13 is inactive and the angular position of the inner sleeve 4 relative to the outer sleeve 5 and to the shaft 3 is maintained when a main motor (not illustrated in FIG. 1) rotates the pneumatic drum 1.

Figure 2:
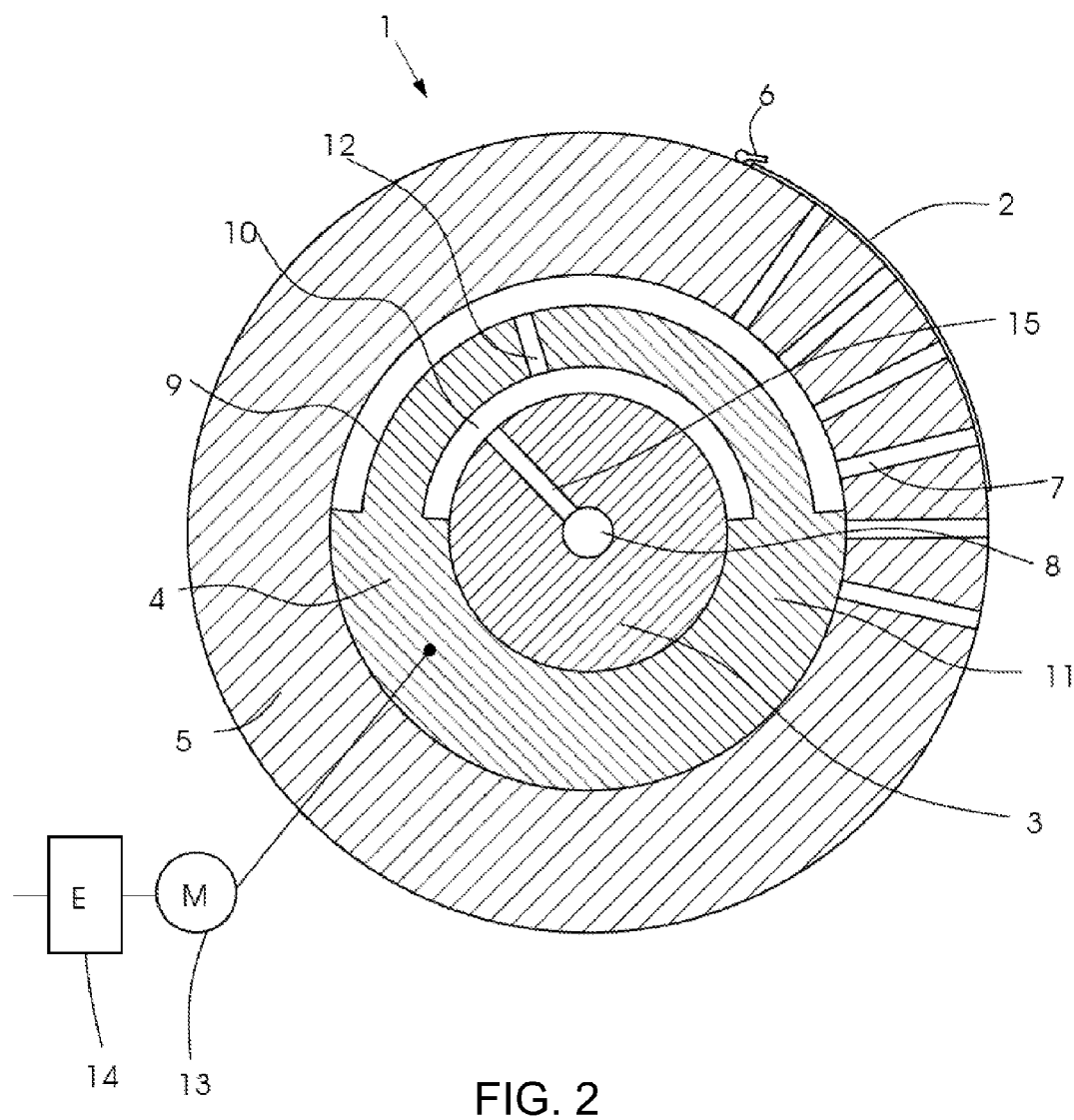
FIGS. 2 and 3 are respective cross-sectional and front-elevational views of a pneumatic drum with an actuating drive for format changes disposed external to the drum.
Figure 3:
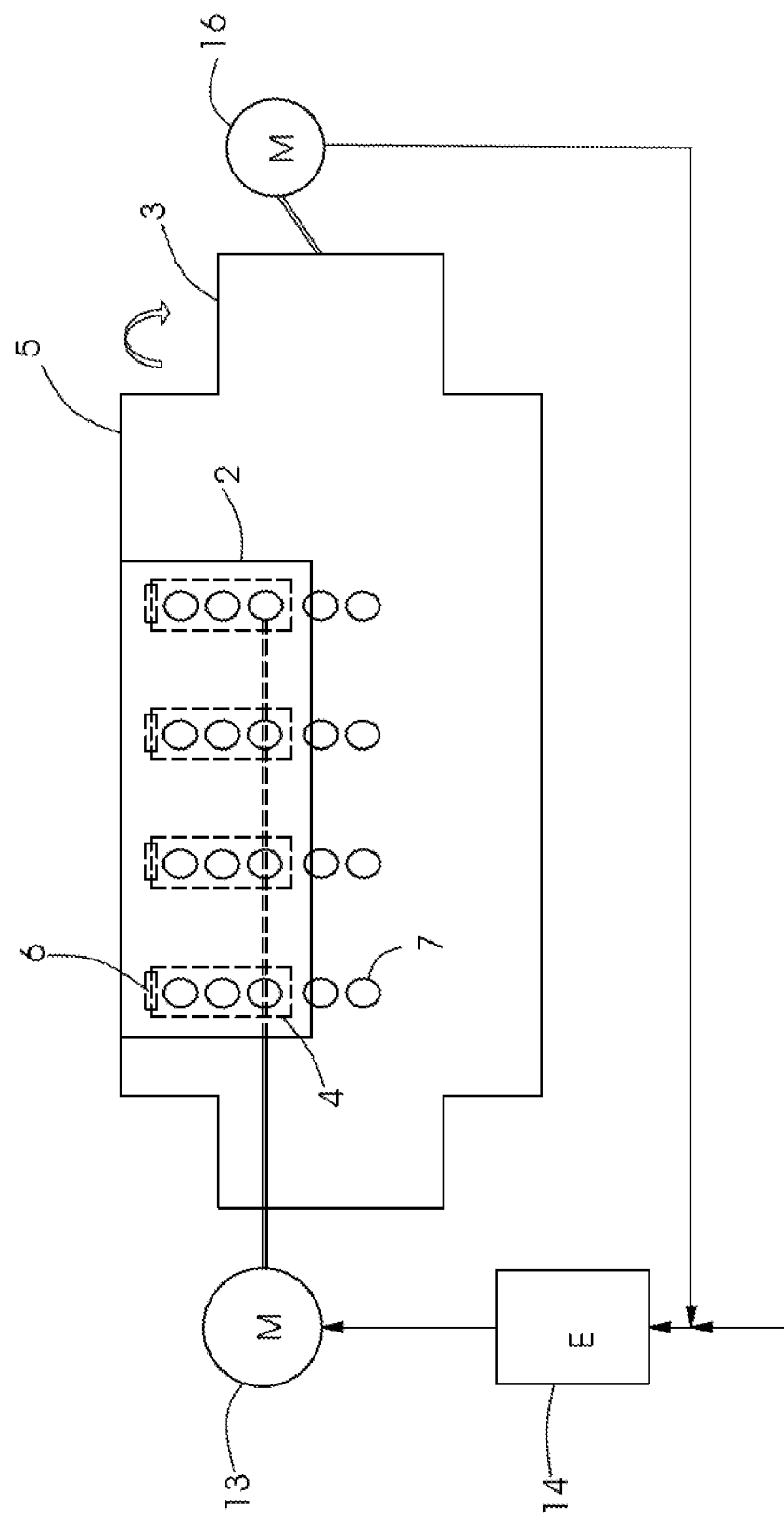

FIGS. 2 and 3 illustrate a modification of the pneumatic drum 1 of FIG. 1. FIG. 2 is a cross-sectional view and FIG. 3 is a front-elevational view of the modified drum 1.

FIG. 3 shows a main motor 16 (second motor) that drives the rotation of the outer sleeve 5 about the shaft 3 while the machine is running.

In contrast to FIG. 1, in this modified embodiment, the actuating motor 13 (first motor) and the control unit 14 are disposed outside the drum. A further difference between the pneumatic drum of FIG. 1 and the modified embodiment is that in the latter, the rotary joint is an exclusively pneumatic rotary joint 8. The functions of transmitting electrical power and control signals (data) have been eliminated in the rotary joint 8.

Since there are no further structural differences between the embodiment of FIG. 1 and the embodiment of FIGS. 2 and 3, the above description of the common features also applies to the modified embodiment of FIGS. 2 and 3.

The pneumatic drum 1 shown in FIGS. 2 and 3 operates as follows:

Once the sheet format has been set, the control unit 14 controls the actuating motor 13 in such a way that the latter runs in synchronism with the main motor 16 while the angular position of the inner sleeve 4 relative to the outer sleeve 5 remains unchanged. The control unit 14 controls the actuating motor 13 as a function of the main motor 16, which has a rotary speed that is signaled to the control unit 14.

When the sheet format is to be changed, the actuating motor 13 and the main motor 16 continue to run without any interruption, i.e. a flying format change is carried out. The control unit 14 controls the actuating motor 13 in accordance with a format to be set as it is input by an operator or received from a data memory and in such a way that the actuating motor 13 temporarily runs asynchronously with the main motor 16. The phase position of the inner sleeve 4 relative to the outer sleeve 5 is modified by a brief acceleration or deceleration phase of the actuating motor 13.

Due to this temporary over synchronous or under synchronous rotation of the actuating motor 13 and the inner sleeve 4, the number of passive nozzle channels 7 which are covered by the covering segment 11, and the number of active nozzle channels 7 that are not covered by the covering segment 11, are changed in favor of one or of the other. When the actuating motor 13 has a brief lead over the main motor, the number of active nozzle channels 7 is reduced to set a smaller sheet format; when the actuating motor 13 briefly lags behind the main motor, the number of active nozzle channels 7 is increased to set a larger sheet format.

All of this may be carried out at an unreduced, constant speed of the main motor 16, eliminating the need for decelerating, stopping and reaccelerating the machine, thus saving changeover time. The actuating motor 13 continues to be active during regular machine operation, i.e. during the print run, and during a format change.

In addition to the description provided above, according to another modification of the exemplary embodiment shown in FIGS. 2 and 3, the inner sleeve 4 and the outer sleeve 5 are connected by a superimposing gearbox and the actuating drive 13 is only active during a format change but is passive during regular operation of the machine. In order to carry out a format change, the actuating motor 13 is temporarily activated, introducing an additional driving motion into the superimposing gearbox.

In this context, the actuating drive 13 may rotate in a first direction of rotation, causing the driving motions or rotary speeds of the actuating motor 13 and of the main motor 16 to add up in the superimposing gearbox, or the actuating drive 13 may rotate in a second direction of rotation, causing the driving motion or rotary speed of the actuating motor 13 to be subtracted from the driving motion or rotary speed of the main motor 16 in the superimposing gearbox. In the former case, the result is a lead of the inner sleeve 4 over the outer sleeve 5 to reduce the drum format; in the latter case the result is that the inner sleeve 4 lags behind the outer sleeve to increase the drum format.

The invention claimed is:

1. A machine for processing sheets of different formats, the machine comprising:
    a pneumatic drum having an outer sleeve with pneumatic nozzle channels and an inner sleeve with a covering segment for covering said nozzle channels in a format-dependent way, said inner sleeve being concentric with said outer sleeve, said inner sleeve having pneumatic grooves provided as circumferential grooves; and
    a first motor configured to rotate said inner sleeve relative to said outer sleeve while the machine is running to carry out a flying format change of said pneumatic drum.

2. The sheet-processing machine according to claim 1, which further comprises a control unit configured to control said first motor in such a way that once the format has been set, an angular position of said inner sleeve relative to said outer sleeve remains unchanged.

3. The sheet-processing machine according to claim 2, wherein said first motor is controlled by said control unit in such a way that said first motor is at a rotary standstill once the format has been set.

4. The sheet-processing machine according to claim 2, wherein said first motor is disposed inside said pneumatic drum.

5. The sheet-processing machine according to claim 2, which further comprises a second motor configured to drive said outer sleeve, said first motor being controlled by said control unit in such a way that once the format has been set, said first motor drives said inner sleeve in synchronism with said outer sleeve being driven by said second motor.

6. The sheet-processing machine according to claim 5, wherein said first motor and said second motor are disposed outside said pneumatic drum.

7. The sheet-processing machine according to claim 1, which further comprises a shaft connected to said outer sleeve for co-rotation with said outer sleeve, said inner sleeve disposed for rotation on said shaft.

8. The sheet-processing machine according to claim 7, which further comprises a rotary joint disposed on said shaft.

9. The sheet-processing machine according to claim 8, wherein said rotary joint is a pneumatic and electrical rotary joint.

10. The sheet-processing machine according to claim 1, wherein the machine is a printing press, a digital printer or a die-cutting machine.

11. machine for processing sheets of different formats, the machine comprising:
    a pneumatic drum having an outer sleeve with pneumatic nozzle channels and an inner sleeve with a covering segment for covering said nozzle channels in a format-dependent way, said covering segment being tightly fitted against an inner circumferential surface of said outer sleeve for selectively closing openings of said nozzle channels at said inner circumferential surface, said inner sleeve having pneumatic grooves provided as circumferential grooves; and
a first motor configured to rotate said inner sleeve relative to said outer sleeve while the machine is running to carry out a flying format change of said pneumatic drum.

* * * * *